United States Patent [19]
Chen

[11] Patent Number: 5,977,733
[45] Date of Patent: Nov. 2, 1999

[54] FAN CONTROL DEVICE WITH BREAKDOWN WARNING CAPABILITY

[75] Inventor: Tsung-Chun Chen, Taipei Hsien, Taiwan

[73] Assignee: Shin Jiuh Corporation, Taiwan

[21] Appl. No.: 09/206,862

[22] Filed: Dec. 8, 1998

[51] Int. Cl.[6] .............................. H02H 7/08; G08B 21/00
[52] U.S. Cl. ..................... 318/434; 388/903; 388/907.5
[58] Field of Search ................................. 318/434, 268; 388/903, 907.5, 908, 909; 361/23

[56] References Cited

U.S. PATENT DOCUMENTS

| | | | |
|---|---|---|---|
| 4,642,441 | 2/1987 | Kenyon . | |
| 5,105,133 | 4/1992 | Yang | 318/443 |
| 5,448,143 | 9/1995 | Pecone | 318/434 |
| 5,457,766 | 10/1995 | Ko | 388/831 |
| 5,513,361 | 4/1996 | Young | 395/750.03 |
| 5,534,854 | 7/1996 | Bradbury et al. | 340/648 |
| 5,612,677 | 3/1997 | Baudry | 340/584 |
| 5,631,852 | 5/1997 | Chen | 702/130 |
| 5,727,928 | 3/1998 | Brown | 417/44.11 |
| 5,769,705 | 6/1998 | O'Callaghan et al. | 454/184 |
| 5,889,469 | 3/1999 | Mykytiuk et al. | 318/434 X |

*Primary Examiner*—Bentsu Ro
*Attorney, Agent, or Firm*—Fish & Richardson P.C.

[57] ABSTRACT

A fan control device includes a fan rotation control circuit adapted to be connected electrically to a fan and adapted to control activation and deactivation of the fan. The fan rotation control circuit generates a voltage output corresponding to driving current flowing through the fan to indicate operating speed of the fan. A comparator circuit is connected to the fan rotation control circuit and is operable so as to perform a comparison operation in order to compare the voltage output of the fan rotation control circuit with a reference speed signal, and so as to generate a logic output corresponding to result of the comparison operation. A processor receives the logic output of the comparator circuit, and controls the fan rotation control circuit to deactivate the fan upon determining that the operating speed of the fan is abnormally slow, indicating that the fan is in a near-breakdown condition, based on the logic output of the comparator circuit. A warning circuit is connected to and controlled by the processor so as to generate a warning output upon determination by the processor that the operating speed of the fan is abnormally slow.

9 Claims, 5 Drawing Sheets

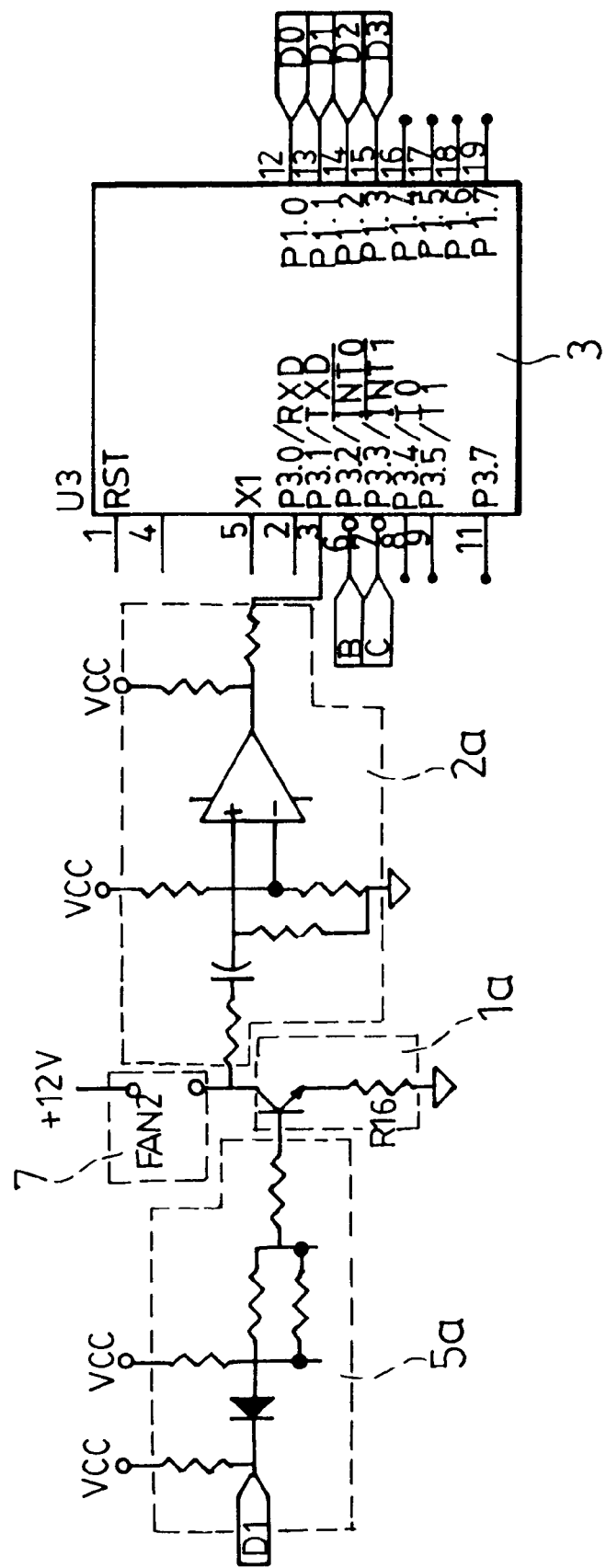
F I G. 3A

FAN CONTROL DEVICE WITH BREAKDOWN WARNING CAPABILITY

BACKGROUND OF THE INVENTION

1. Field of the Invention

The invention relates to a fan control device, more particularly to a fan control device with a breakdown warning capability so as to be capable of shutting down a fan and of generating a warning signal upon detecting that the fan speed is abnormally slow, indicative of a near-breakdown condition.

2. Description of the Related Art

After operating for a period of time, an electrical appliance, such as a desktop computer, a notebook computer, a server or an uninterruptible power system, generates heat that causes the internal temperature of the electrical appliance to rise. This increase in temperature can lead to malfunctioning of the electrical appliance that, in some cases, can result in loss of data and even in damage to electronic components of the appliance. In order to dissipate heat quickly from the interior of the electrical appliance, a heat-dissipating device, such as a fan, is usually installed inside the appliance.

A conventional low-cost heat-dissipating fan commonly found in electrical appliances has two input wires to be connected to positive and negative terminals of a power supply. When the appliance is activated, power is supplied to operate the fan. When the appliance is deactivated, power is cut-off to stop operation of the fan. However, when breakdown of the fan has occurred and is not detected in time, malfunctioning of the electrical appliance can still occur and can result in loss of data and even in damage to electronic components of the appliance.

It has been observed that, before the fan comes to a full stop due to breakdown, the speed of the fan gradually decreases from the normal operating speed. As such, whether or not breakdown of the fan is about to occur can be determined by observing the speed of the fan. To this end, another conventional heat-dissipating fan has been developed to incorporate two power input wires for connection to positive and negative terminals of a power supply, and a clock output wire that provides a clock output corresponding to the speed of the fan. That is, when the fan operates at a relatively fast speed, a high-speed clock output is generated at the clock output wire. Accordingly, when the fan operates at a relatively slow speed, a low-speed clock output is generated at the clock output wire. Thus, by observing the speed of the clock output, one can determine whether or not breakdown of the fan is about to occur so that replacement of the fan can be conducted.

However, because of the relatively high cost of the conventional three-wire heat-dissipating fan, most electrical appliances, such as desktop computers, notebook computers, servers and uninterruptible power systems, still use the conventional two-wire heat-dissipating fan described beforehand.

SUMMARY OF THE INVENTION

Therefore, the main object of the present invention is to provide a relatively inexpensive fan control device with a breakdown warning capability so as to be capable of shutting down a fan, such as the aforesaid conventional two-wire heat-dissipating fan, and of generating a warning signal upon detecting that the fan speed is abnormally slow, indicative of a near-breakdown condition.

Another object of the present invention is to provide a fan control device of the aforementioned type that is capable of adjusting the fan speed according to the ambient temperature conditions, thereby prolonging the service life and reducing the power consumption of the fan.

Accordingly, the fan control device of this invention is used to control the operation of a fan, and comprises:

a fan rotation control circuit adapted to be connected electrically to the fan and adapted to control activation and deactivation of the fan, the fan rotation control circuit generating a voltage output corresponding to driving current flowing through the fan to indicate operating speed of the fan;

a comparator circuit connected to the fan rotation control circuit and operable so as to perform a comparison operation to compare the voltage output of the fan rotation control circuit with a reference speed signal and so as to generate a logic output corresponding to result of the comparison operation;

processor means connected to the comparator circuit and the fan rotation control circuit, the processor means receiving the logic output of the comparator circuit and controlling the fan rotation control circuit to deactivate the fan upon determining that the operating speed of the fan is abnormally slow, indicating that the fan is in a near-breakdown condition, based on the logic output of the comparator circuit; and a warning circuit connected to and controlled by the processor means so as to generate a warning output upon determination by the processor means that the operating speed of the fan is abnormally slow.

Preferably, the fan rotation control circuit includes a transistor adapted to be connected in series with the fan to permit flow of the driving current therethrough, and a resistor connected in series with the transistor. The comparator circuit includes a direct current filter circuit connected to the fan rotation control circuit and operable so as to filter the voltage output of the fan rotation control circuit to result in a fan speed signal, and a comparator connected to the filter circuit and the processor means. The comparator compares the fan speed signal with the reference speed signal, and provides the logic output to the processor means.

In the preferred embodiment, a current control circuit interconnects the processor means and the fan rotation control circuit, and is controlled by the processor means to control, in turn, activation and deactivation of the fan by the fan rotation control circuit. The current control circuit includes a temperature sensor for detecting ambient temperature and for controlling the fan rotation control circuit to increase the operating speed of the fan when the ambient temperature is relatively high, and to decrease the operating speed of the fan when the ambient temperature is relatively low.

BRIEF DESCRIPTION OF THE DRAWINGS

Other features and advantages of the present invention will become apparent in the following detailed description of the preferred embodiment with reference to the accompanying drawings, of which:

FIGS. 3A to 3C are schematic electrical circuit diagrams illustrating how the preferred embodiment can be used to control second to fourth fans, respectively.

DETAILED DESCRIPTION OF THE PREFERRED EMBODIMENT

Figure 1:
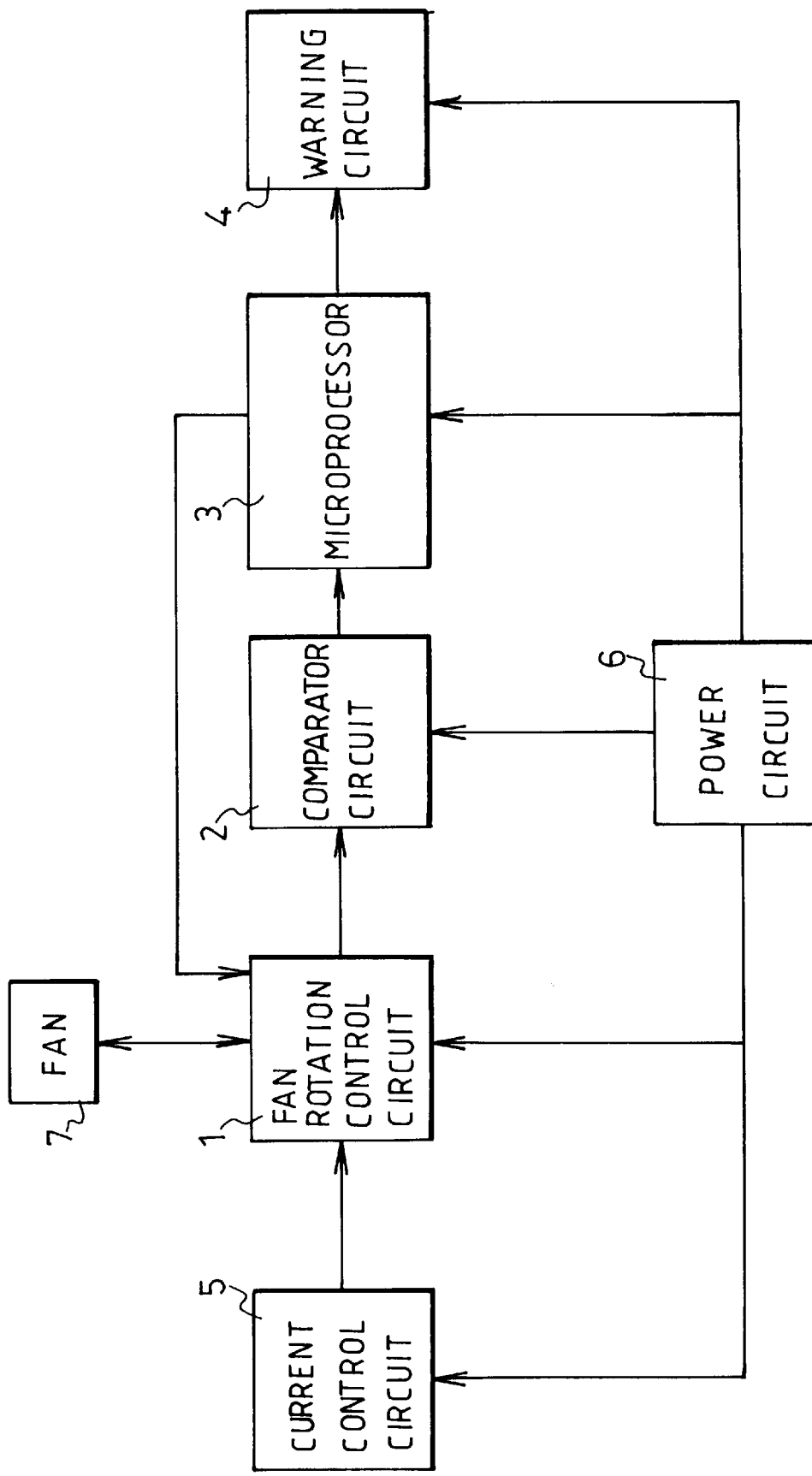
FIG. 1 is a schematic circuit block diagram of the preferred embodiment of a fan control device with a breakdown warning capability according to the present invention.
Figure 2:
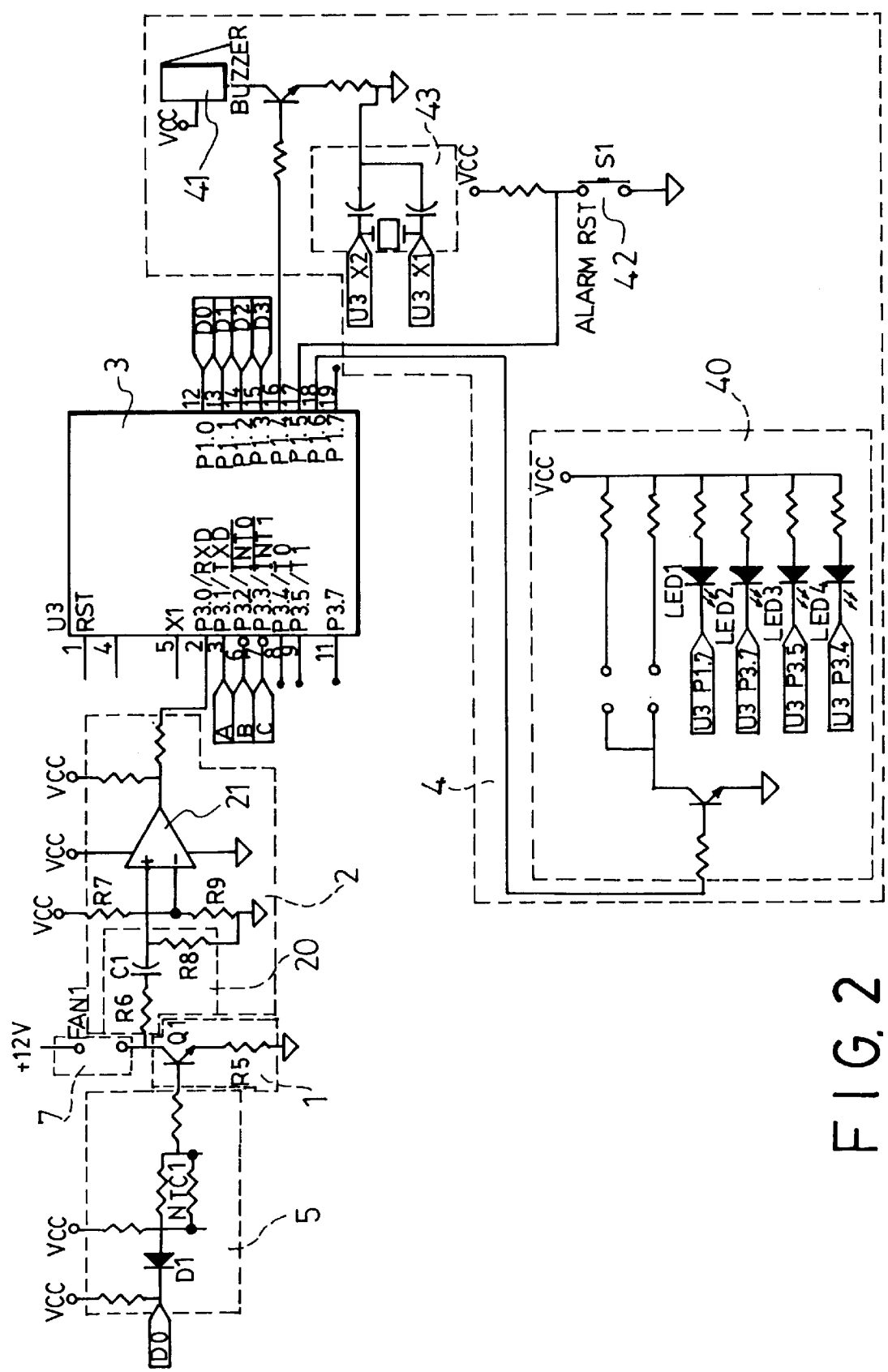
FIG. 2 is a schematic electrical circuit diagram illustrating how the preferred embodiment controls a first fan.
Figure 3B:
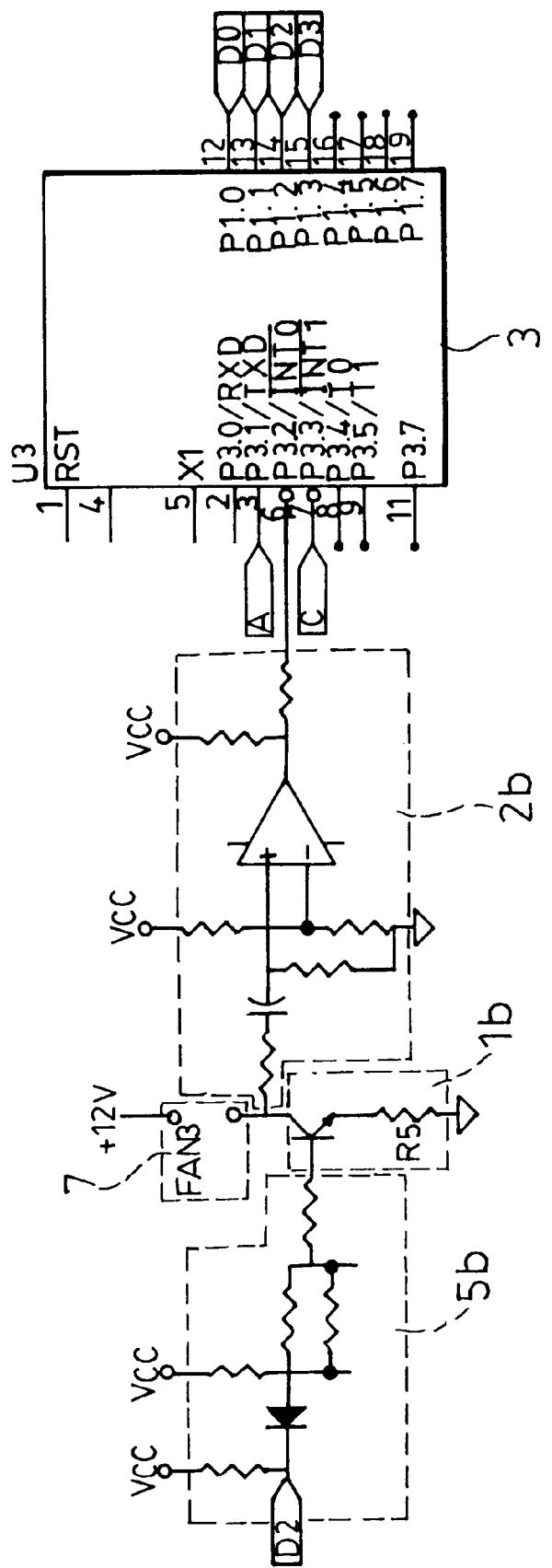
Figure 3C:
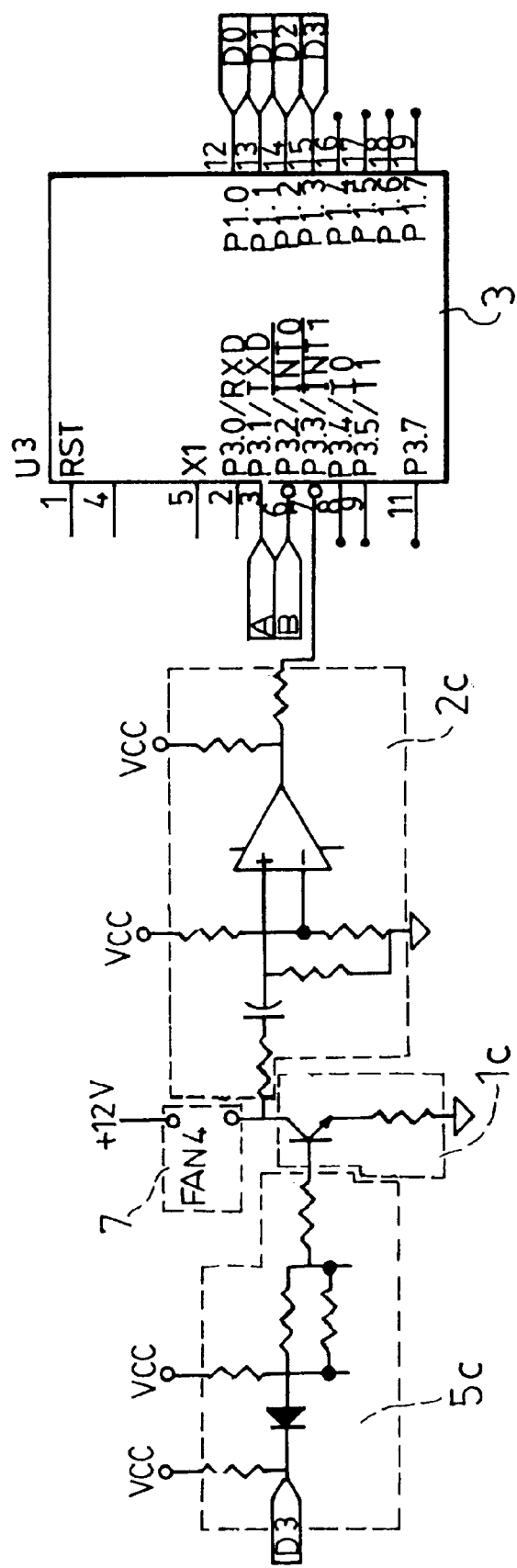

Referring to FIGS. 1 and 2, the preferred embodiment of a fan control device with a breakdown warning capability according to the present invention is shown to comprise a fan rotation control circuit 1, a comparator circuit 2, a microprocessor 3, a warning circuit 4, a current control circuit 5 and a power circuit 6.

The fan rotation control circuit 1 includes a transistor (Q1) and a resistor (R5) connected in series with an emitter of the transistor (Q1). The collector of the transistor (Q1) is adapted to be connected in series with a fan (FAN1) 7. Driving current flows through the fan (FAN1) 7 when the transistor (Q1) conducts, thereby activating the fan (FAN1) 7. Driving current is prevented from flowing through the fan (FAN1) 7 when the transistor (Q1) is cut-off, thereby shutting down the fan (FAN1) 7. The driving current through the fan (FAN1) 7, which incorporates carbon brushes, varies according to the operating speed of the latter. A voltage output corresponding to the driving current to indicate the operating speed of the fan (FAN1) 7 is generated by the fan rotation control circuit 1 due to the presence of the resistor (R5).

The comparator circuit 2 includes a direct current (dc) filter circuit 20 and a comparator 21. The filter circuit 20 includes a resistor (R6), a capacitor (C1), and a resistor (R8). The voltage output of the fan rotation control circuit 1 is filtered by the filter circuit 20 to result in a fan speed signal. The comparator 21 is connected to the filter circuit 20, and compares the fan speed signal with a reference speed signal obtained from a voltage divider circuit that includes a pair of resistors (R7, R9). The comparator 21 generates a high logic output when the fan speed signal is greater than the reference speed signal, and generates a low logic output when the fan speed signal is less than the reference speed signal.

The microprocessor 3 is connected to the comparator circuit 2 and receives the logic output of the latter. Upon detecting that the fan speed has dropped below the reference speed, the microprocessor 3 generates a fan control signal to cut-off the transistor (Q1) and shut down the fan (FAN1) 7. The microprocessor 3 also generates a warning signal concurrent with the fan control signal.

The microprocessor 3 can be used to control up to four fans (FAN1, FAN2, FAN3, FAN4) 7. As shown in FIGS. 2, 3A, 3B and 3C, when four fans (FAN1, FAN2, FAN3, FAN4) 7 are installed, each of the fans (FAN1, FAN2, FAN3, FAN4) 7 is associated with a respective fan rotation control circuit (1, *a*, 1*b*, 1*c*), a respective comparator circuit (2, 2*a*, 2*b*, 2*c*), and a respective current control circuit (5, 5*a*, 5*b*, 5*c*), the purpose of the latter will be described hereinafter. Since the fans (FAN1, FAN2, FAN3, FAN4) 7 are controlled by the fan control device of this invention in substantially the same manner, only the control of the fan (FAN1) 7 in FIG. 2 will be described hereinafter for the sake of brevity.

The warning circuit 4 is connected to the microprocessor 3 to receive the warning signal from the latter. The warning circuit 4 includes a light indicator 40, a sound generator 41 and a reset circuit 42.

The light indicator 40 includes four light emitting diodes (LED1, LED2, LED3, LED4), each of which is associated with a corresponding one of the fans (FAN1, FAN2, FAN3, FAN4) 7. The light emitting diodes (LED1, LED2, LED3, LED4) are activated by the microprocessor 3 to generate a visual warning output when the corresponding one of the fans (FAN1, FAN2, FAN3, FAN4) is in a near-breakdown condition.

The warning circuit 4 further includes an oscillator 43 that is connected to the microprocessor 43. The warning signal from the microprocessor 3 is used to activate the sound generator 41, such as a buzzer, to generate an audible warning output.

The reset circuit 42 is connected to the microprocessor 3, and includes a reset switch (S1) that is normally in an OFF state. When the sound generator 41 generates the audible warning output, the reset switch (S1) is operable so as to cause the microprocessor 3 to disable the sound generator 41.

The current control circuit 5 connects the microprocessor 3 and the fan rotation control circuit 1. When the current control circuit 5 receives a high logic input from the microprocessor 3, a diode (D1) of the current control circuit 5 does not conduct, and the transistor (Q1) of the fan rotation control circuit 1 conducts to activate the fan (FAN1) 7. When the current control circuit 5 receives a low logic input from the microprocessor 3, the diode (D1) conducts, and the transistor (Q1) of the fan rotation control circuit 1 is cut-off to shut down the fan (FAN1) 7. The current control circuit 5 incorporates a temperature sensor 50. In the preferred embodiment, the temperature sensor 50 is a thermistor (NTC1). Depending on the ambient temperature, the temperature sensor 50 controls the fan rotation control circuit 1 to vary the operating speed of the fan (FAN1) 7. More particularly, when the ambient temperature is relatively high, the resistance of the thermistor (NTC1) decreases, thereby enabling the fan rotation control circuit 1 to increase the operating speed of the fan (FAN1). When the ambient temperature is relatively low, the resistance of the thermistor (NTC1) increases, thereby enabling the fan rotation control circuit 1 to reduce the operating speed of the fan (FAN1) 7. The effect of the temperature sensor 50 is to prolong the service life and reduce the power consumption of the fan (FAN1) 7.

The power circuit 6 is responsible for supplying operating power to the various electrical components of the fan control device.

The advantages of the fan control device of this invention are as follows:

1. The fan control device can shut down a fan upon detection that the fan speed has become abnormally slow (indicative of a near-breakdown condition), and can generate a warning signal to warn the user of the occurrence of the near-breakdown condition so that timely replacement of the fan can be conducted.
2. Costs can be substantially reduced.
3. According to changes in the ambient temperature, the fan speed can be varied to prolong the service life and reduce the power consumption of the fan.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A fan control device for controlling operation of a fan, comprising:

a fan rotation control circuit adapted to be connected electrically to the fan and adapted to control activation and deactivation of the fan, said fan rotation control circuit generating a voltage output corresponding to driving current flowing through the fan to indicate operating speed of the fan;

a comparator circuit connected to said fan rotation control circuit and operable so as to perform a comparison operation to compare the voltage output of said fan rotation control circuit with a reference speed signal and so as to generate a logic output corresponding to result of the comparison operation;

processor means connected to said comparator circuit and said fan rotation control circuit, said processor means receiving the logic output of said comparator circuit and controlling said fan rotation control circuit to deactivate the fan upon determining that the operating speed of the fan is abnormally slow, indicating that the fan is in a near-breakdown condition, based on the logic output of said comparator circuit; and a warning circuit connected to and controlled by said processor means so as to generate a warning output upon determination by said processor means that the operating speed of the fan is abnormally slow.

2. The fan control device as claimed in claim 1, wherein said fan rotation control circuit includes a transistor adapted to be connected in series with the fan to permit flow of the driving current therethrough, and a resistor connected in series with said transistor.

3. The fan control device as claimed in claim 1, wherein said comparator circuit includes a direct current filter circuit connected to said fan rotation control circuit and operable so as to filter the voltage output of said fan rotation control circuit to result in a fan speed signal, and a comparator connected to said filter circuit and said processor means, said comparator comparing the fan speed signal with the reference speed signal, and providing the logic output to said processor means.

4. The fan control device as claimed in claim 1, further comprising a current control circuit interconnecting said processor means and said fan rotation control circuit and controlled by said processor means to control, in turn, activation and deactivation of the fan by said fan rotation control circuit.

5. The fan control device as claimed in claim 4, wherein said current control circuit includes a temperature sensor for detecting ambient temperature and for controlling said fan rotation control circuit to increase the operating speed of the fan when the ambient temperature is relatively high, and to decrease the operating speed of the fan when the ambient temperature is relatively low.

6. The fan control device as claimed in claim 5, wherein said temperature sensor includes a thermistor.

7. The fan control device as claimed in claim 1, wherein said warning circuit includes a sound generator that is connected to and enabled by said processor means so as to generate an audible output that serves as the warning output upon determination by said processor means that the operating speed of the fan is abnormally slow.

8. The fan control device as claimed in claim 7, wherein said warning circuit further includes a reset circuit connected to said processor means and operable so as to cause said processor means to disable said sound generator.

9. The fan control device as claimed in claim 1, wherein said warning circuit includes a light indicator that is connected to and enabled by said processor means so as to generate a visual output that serves as the warning output upon determination by said processor means that the operating speed of the fan is abnormally slow.

* * * * *